(12) United States Patent
Artt

(10) Patent No.: US 6,732,637 B2
(45) Date of Patent: May 11, 2004

(54) FORCED CONVECTION AND RADIANT HEAT COOKING

(75) Inventor: Paul R. Artt, Dallas County, TX (US)

(73) Assignee: QNC, Inc., Dallas, TX (US)

( * ) Notice: Subject to any disclaimer, the term of this patent is extended or adjusted under 35 U.S.C. 154(b) by 51 days.

(21) Appl. No.: 10/164,452

(22) Filed: Jun. 6, 2002

(65) Prior Publication Data

US 2003/0226452 A1 Dec. 11, 2003

(51) Int. Cl.[7] ................................................ A23B 4/03
(52) U.S. Cl. .......................... 99/476; 99/446; 99/474
(58) Field of Search ............................ 99/476, 474, 475, 99/400, 446; 126/21 A

(56) References Cited

U.S. PATENT DOCUMENTS

| | | | | |
|---|---|---|---|---|
| 3,828,760 A | * | 8/1974 | Farber et al. ............. 126/21 A |
| 4,244,979 A | * | 1/1981 | Roderick ................... 99/474 X |
| 4,824,644 A | * | 4/1989 | Cox et al. ............. 126/21 A X |
| 5,160,829 A | * | 11/1992 | Chang ................... 126/21 A X |
| 5,695,668 A | * | 12/1997 | Boddy ...................... 99/476 X |

* cited by examiner

Primary Examiner—Reginald L. Alexander
(74) Attorney, Agent, or Firm—Jack A. Kanz

(57) ABSTRACT

Cooking apparatus having an enclosed cooking chamber with a radiant heater suspended in the upper portion thereof provides radiant and forced air convection heating to cook food products. The food is contained in a cooking tray which has a screen or perforated bottom to allow grease, oils and crumbs to pass through the cooking tray. A drip tray below the cooking tray catches liquids and/or crumbs which fall through the cooking tray. A shell positioned within the cooking chamber forms air plenums adjacent the sides of the chamber so that air circulating within the chamber is passed through the cooking tray. The food is cooked by a combination of the hot air passing through the product carried on the cooking tray and radiant heat from the radiant heater.

8 Claims, 5 Drawing Sheets

FORCED CONVECTION AND RADIANT HEAT COOKING

This invention relates to greaseless cooking of food products. More particularly, it relates to methods and apparatus for rapidly cooking food products with simultaneous radiant heating and forced air convection heating.

Quickly prepared food products (often referred to as fast foods) are conventionally prepared on-site using various commercial cooking devices such as deep-fat fryers, grills, convection ovens, radiant heat ovens, rotisseries and the like. However, deep-fat frying and grilling raw meat on an open grill or pit is relatively dangerous since hot oils and fats are potential fire hazards and dangerous to personnel. Equipment for safely cooking such items typically requires a vented hood system which draws grease-laden vapor and smoke from the cooking equipment through filters and stainless steel ductwork to an external exhaust. Such vented hood systems usually include a fire extinguisher system and thus are expensive to install and maintain. Because of the increased risk of fire, operators of such systems generally incur expensive fire insurance premiums. Accordingly, operators of fast food restaurants, sports arenas, amusement parks and other operations which sell fast foods are always searching for better ways to cook food faster, cleaner, more safely and less expensively.

Commercial food processors now offer many menu items (some partially cooked) which can be prepared for serving in a convection oven. Since these menu items are designed to be prepared either in an oven, in a deep-fat fryer or on a grill, they have been widely accepted and the quality and number of such products have improved and increased substantially. However, food products such as battered items (which are usually best when fried) and meats (which are usually best when grilled) suffer in quality when prepared in an ordinary convection oven. The fried type products are often not as crisp as desired and the ordinarily grilled items are not as juicy and tender as they would be if grilled. Although menu items such as french fries, chicken strips, hamburgers, etc., are highly desireable, many fast food operations do not offer such items because of the increased expense and risk associated with the equipment necessary to properly prepare them on-site. There is, therefore, an ever-increasing need for food preparation equipment which does not require use of hot oils or the like and which does not require hoods or other systems to control and remove vapors, etc., generated by the cooking process, but which can quickly and safely cook menu items which ordinarily require deep-fat frying or grilling.

The present invention provides methods and apparatus for quick preparation of food products without the use of hot oils or ventilation systems. In accordance with the invention food products to be cooked are suspended in an open tray with a perforated bottom which allows air to circulate through and around the product contained in the tray. A radiant heater is suspended directly above the open tray to cook the food products by direct radiant heating. Simultaneously, air is drawn over the radiant heater and circulated through the open tray to further cook the food products by forced air convection heating. The cooking chamber is fully enclosed to minimize escape of heat, smoke and cooking vapors during the cooking process. A self-contained air filtration system may be employed to capture vapors which escape when the cooking chamber is opened. The entire unit is self-contained and requires no external vent system. Although food is quickly cooked without using open grills or hot oil vats, the final product is usually well-browned, crisp and cooked throughout as in deep-fried foods, and meat products are as tender and juicy as grilled meats. Simultaneous application of convection and radiant heat to foods in a cooking tray in accordance with the invention produces prepared foods which are vastly superior to the same food products prepared in a conventional convection oven. However, the need for external venting and fire protection equipment is eliminated. Other features and advantages of the invention will become more readily understood from the following detailed description taken in connection with the appended claims and attached drawing in which:

Figure 1:
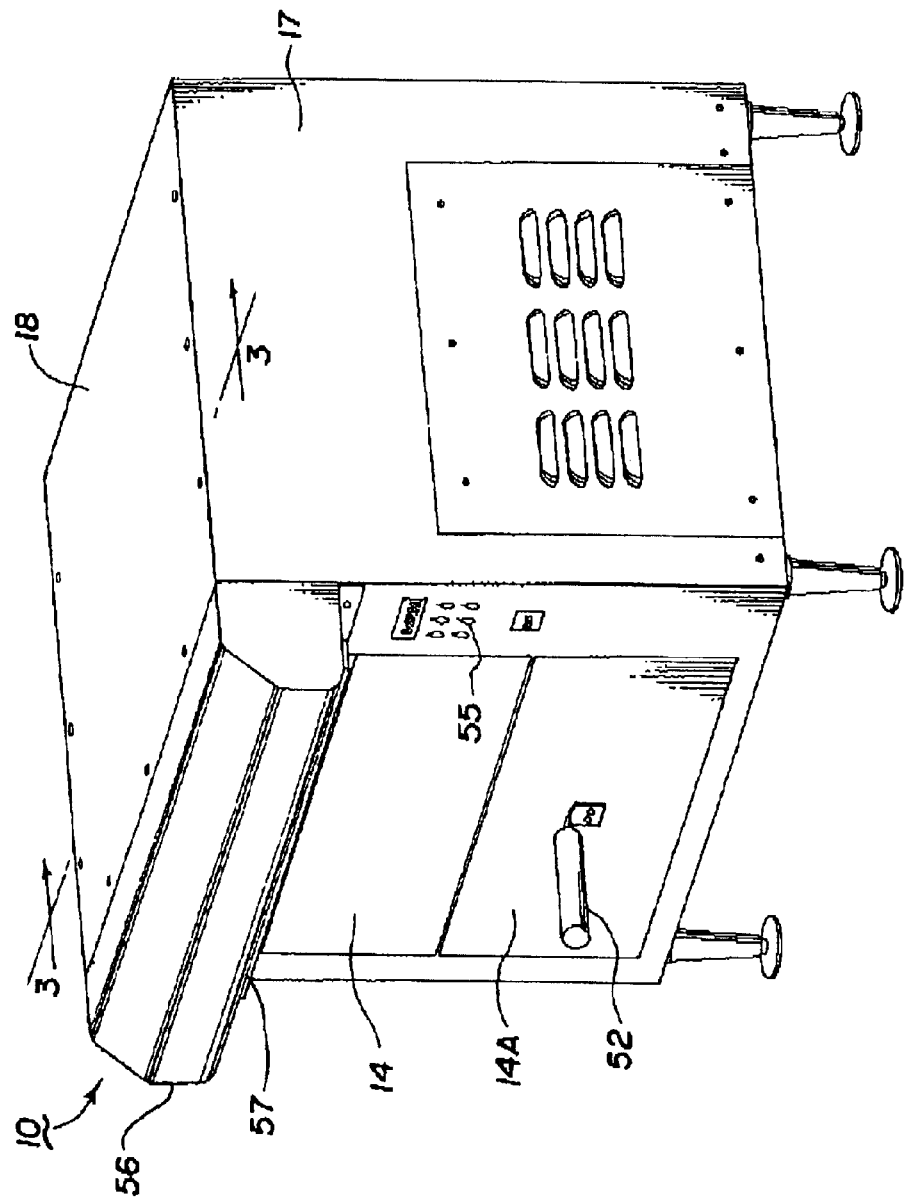
FIG. 1 is a perspective view of a preferred embodiment of a greaseless cooking apparatus employing the principles of the invention.
Figure 2:
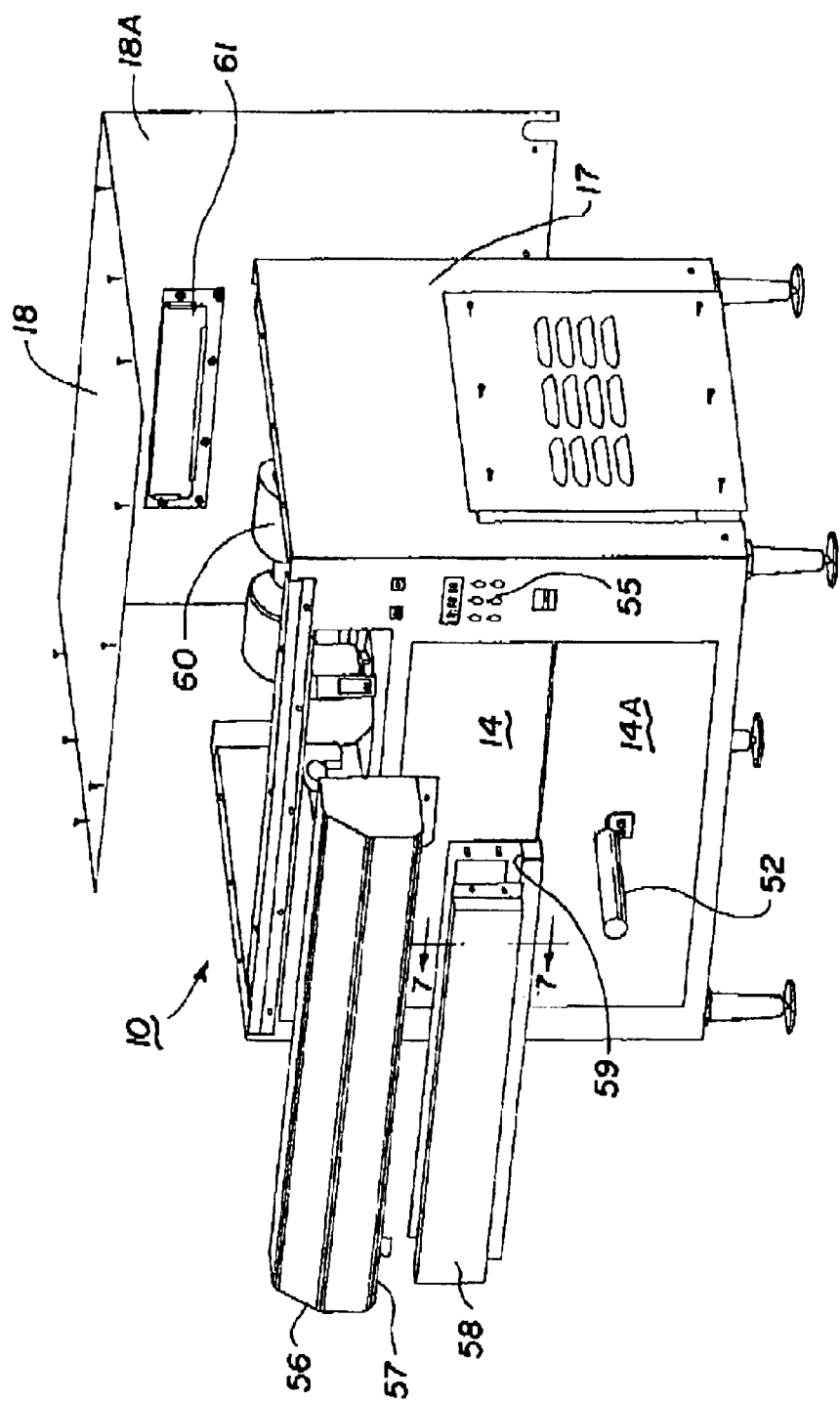
FIG. 2 is a partially exploded view of the apparatus of FIG. 1.

The above-described drawing is incorporated into and forms part of the specification to illustrate exemplary embodiments of the present invention. Throughout the drawing like reference numerals designate corresponding elements. The drawing, together with this description, serves to explain the principles of the invention and is included for the purpose of illustrating preferred and alternative examples of how the invention can be made and used. The drawing is not to be construed as limiting the invention to the illustrated and described examples.

In FIGS. 1–7 a preferred embodiment of the invention is illustrated as a cube-shaped enclosure which employs a radiant heat source and air circulating means such as a fan or impeller to cause simultaneous radiant heating and forced air convection heating of food products within the enclosure. Obviously, other shapes and sizes or cooking apparatus may be employed, depending on the food product to be cooked and the availability of space. Furthermore, it is to be understood that terms such as "radiant heater" and "radiant heat source" as used herein are meant to describe devices which radiate energy (directly or by reflection) onto food products placed within the cooking chamber. For example, suitable radiant heat may be produced by resistance heaters, quartz heaters, infrared sources, microwave sources, halogen lamps and the like. Similarly, terms such as "forced convection", "forced air convection" and the like are used herein to mean and include any heating or cooking process in which air, heated by any source of thermal energy, is forced to pass through or around food products in the cooking chamber.

The preferred embodiment of cooking apparatus illustrated comprises a housing 10 which supports an enclosed cooking chamber 50 defined by a rear wall 11, side walls 12 and 13, front wall 14, top wall 15 and floor 16. The housing 10 includes a top cover 18, 18A which cooperates with top wall 15 and side covers 17 to define a vented space 21 directly above top wall 15. A drive motor 19 is mounted in vented space 21 with its drive shaft extending through top wall 15 to drive an impeller 20 which circulates air in the cooking chamber 50 as hereinafter described. As illustrated, rear wall 11, side walls 12 and 13, top wall 15 and floor 16 are preferably insulated to reduce loss of heat from the cooking chamber 50.

A shell 30 formed by a top member 31 joined to two depending side members 32 (see FIG. 4) is positioned on floor 16. The rear edges of top member 31 and side members 32 are preferably positioned adjacent rear wall 11 and the front edges positioned adjacent front wall 14 so that shell 30 cooperates with front wall 14, rear wall 11 and floor 16 to define an inner chamber 33. Side members 32 are spaced from side walls 12, 13 and thus cooperate with side walls 12, 13 to define plenums 34, 35. A radiant heater 36 projects from rear wall 11 into inner chamber 33 near the top member 31. The top member 31 has top vents 37 therein, preferably in the portion thereof between impeller 20 and radiant heater 36. Side members 32 have similar side vents 38 near the lower edges thereof which permit air to pass from plenums 34, 35 into inner chamber 33. The impeller 20 is supported in enclosed chamber 50 above the top vents 37 and adapted to draw air from the inner chamber 33 through top vents 37 and into plenum chambers 34, 35. Air forced into plenum chambers 34, 35 passes through side vents 38 into the inner chamber 33. Since the radiant heater 36 is positioned directly below top vents 37, the air circulated in the enclosed chamber 50 is continuously drawn over radiant heater 36 and is heated thereby. The preferred route of air circulation is from impeller 20 into plenums 34, 35, through side vents 38 into inner chamber 33 and withdrawn from the inner chamber 33 through the vents 37. Circulation in the reverse direction, however, produces acceptable results.

It will be appreciated that shell 30 need not define an enclosed inner chamber 33. Since the purpose of shell 30 is to direct the circulation of air within the enclosed chamber 50, shell 30 may, in its simplest form, be a baffle arranged to control flow of air over the radiant heater 36 and through the bottom 53 of food tray 51 so that air is circulated through and around food products supported in the cooking tray 51. Furthermore, it will be appreciated that the function of impeller 20 is to circulate air as described. While the air circulating means is illustrated as an impeller 20, other means for moving air (such as fans, blowers and the like) may be used if desired.

Figure 3:
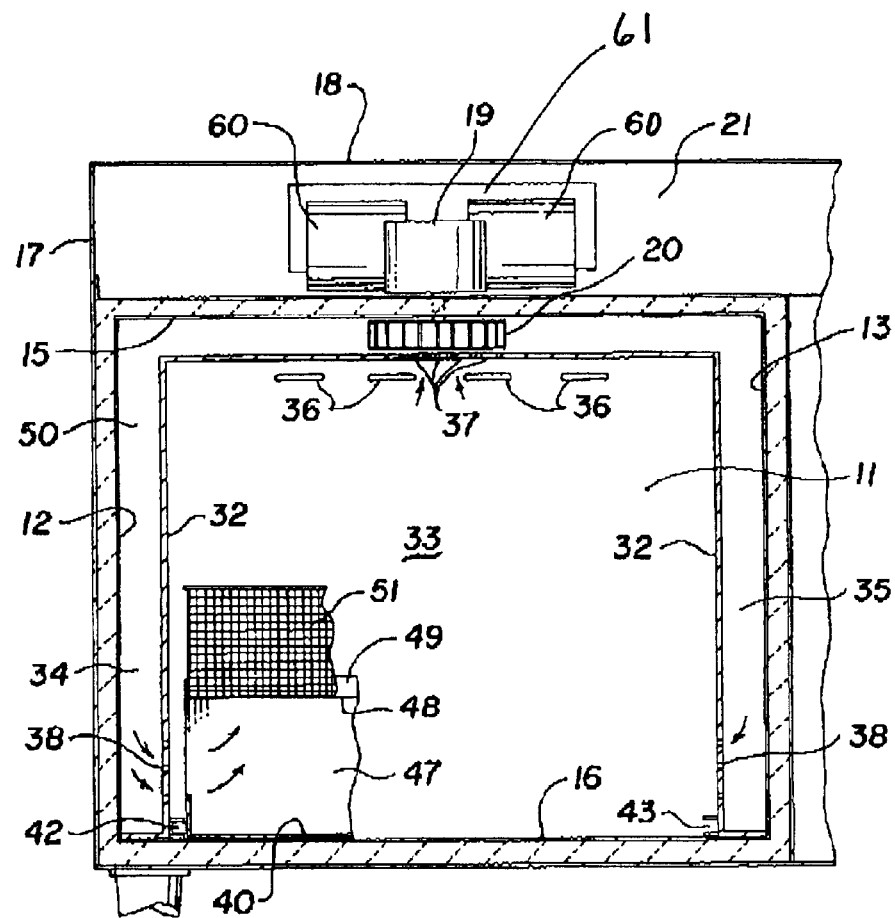
FIG. 3 is a fragmentary sectional view of the apparatus of FIG. 1 taken through line 3—3.
Figure 4:
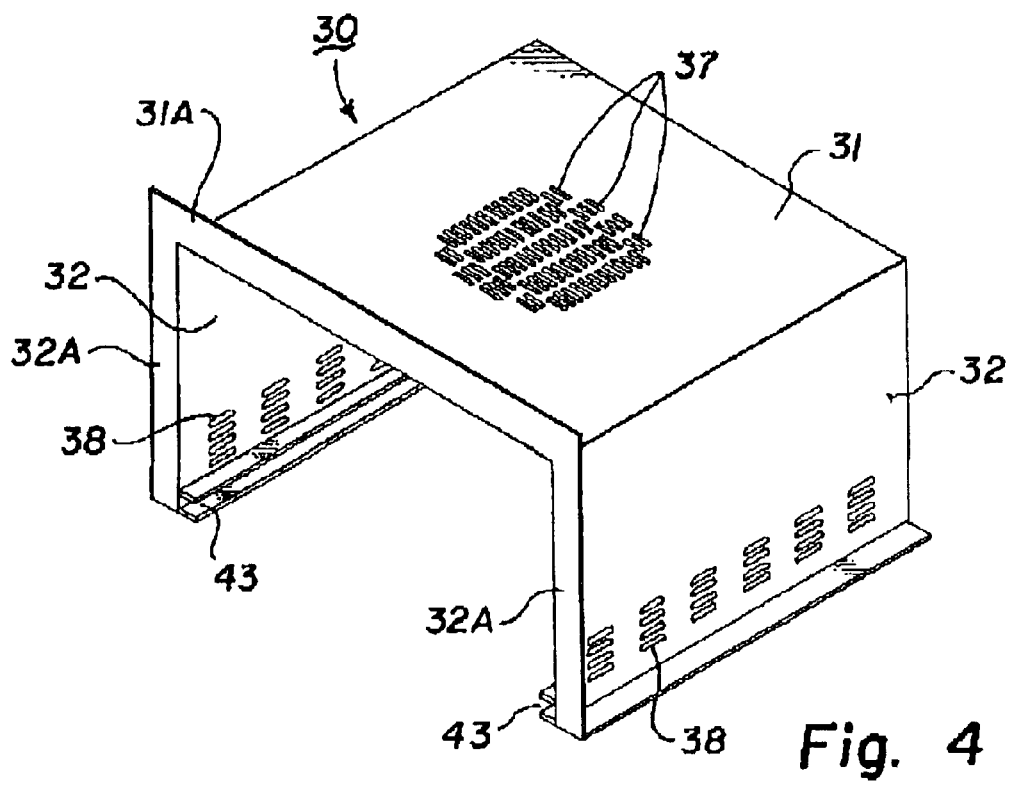
FIG. 4 is a perspective view of the inner shell used in the apparatus of FIG. 1.
Figure 5:
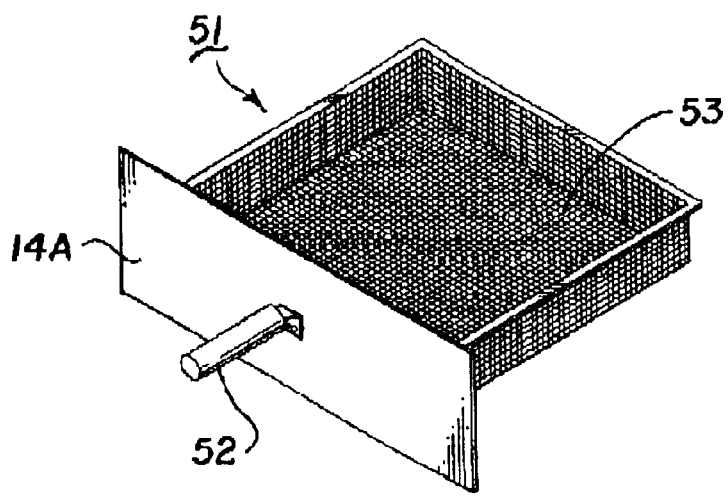
FIG. 5 is a perspective view of the cooking tray used in the apparatus of FIG. 1.
Figure 6:
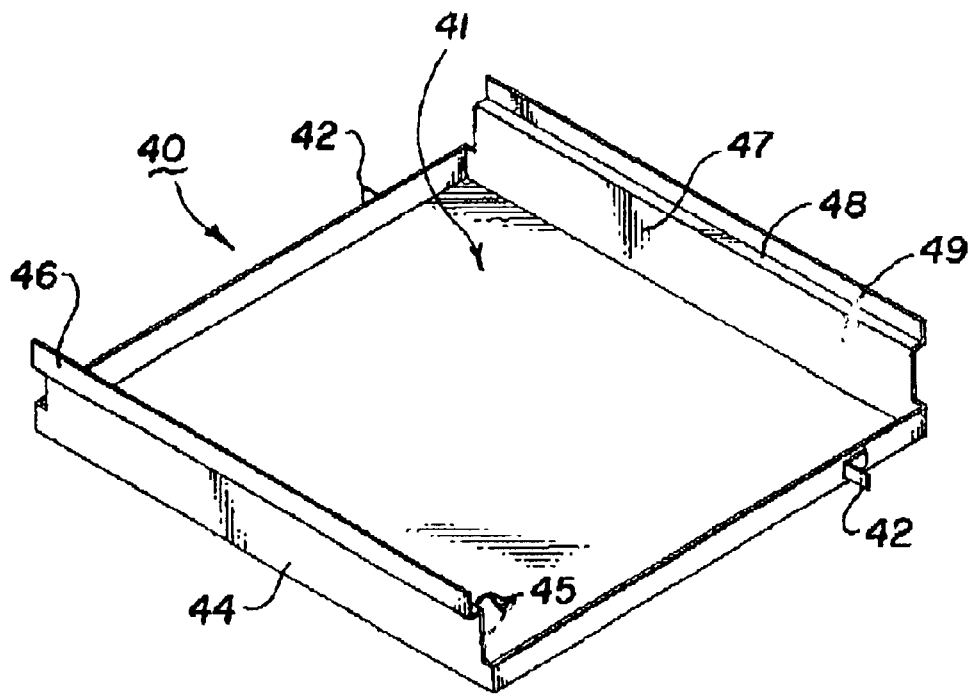
FIG. 6 is a perspective view of the drip tray used in the apparatus of FIG. 1.
Figure 7:
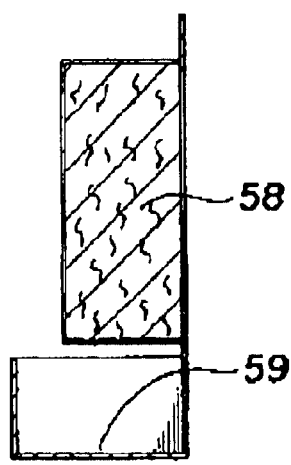
FIG. 7 is a sectional view, taken through line 7—7, of the vapor filter used in the apparatus of FIG. 1.

As illustrated in FIG. 3 a drip tray 40 (see FIG. 6) having a top opening 41 substantially corresponding to the floor area defined by front wall 14, rear wall 11 and side members 31 is positioned on floor 16 to collect crumbs, drippings, etc., which fall from the food being prepared. The drip tray 40 is preferably fitted with drawer tabs 42 which project from the sides of drip tray 40 and ride in channels 43 on the lower inner edges of side members 32. The drawer tabs 42 cooperate with channels 43 to permit drip tray 40 to move back-to-front within inner chamber 33 but prevent drip tray 40 from tipping when partially withdrawn from inner chamber 33. The front edge of drip tray 40 comprises a support wall 44 which extends upwardly from the front of drip tray 40 and supports a ledge or shoulder 45 with a lip 46 extending upwardly from the shoulder 45. The rear edge of drip tray 40 comprises a similar support wall 47 with a shoulder 48 and lip 49. A food tray 51 (see FIG. 5) having a perforated bottom 53 is supported on a removeable portion 14A of front wall 14 and adapted to be seated on shoulders 45, 48 between lips 46, 49. Food tray 51 is sized to fit within inner chamber 33 so that the portion 14A of front wall 14 on which it is supported closes the front of the chamber 50. The food tray 51, however, can be withdrawn from the inner chamber 33 by pull handle 52. Since food tray 51 is nested between lips 46 and 49, withdrawal of food tray 51 results in simultaneous withdrawal of drip tray 40. However, drawer tabs 42 prevent the assembly from tipping until the drawer tabs 42 are fully withdrawn from channels 43.

It will be appreciated that the portion 14A of front wall 14 to which food tray 51 is attached acts as a door or closure to close the front of enclosed chamber 50 as well as inner chamber 33. Electrical controls 55 for operation of the cooking apparatus are conveniently mounted on the front wall and in the space between side wall 13 and side cover 17.

To prepare food products in the apparatus illustrated, food products are placed in the food tray 51 and the cooking chamber closed by placing the food tray 51 on shoulders 45, 48 of drip tray 40 and pushing the drip tray 40 and food tray 51 assembly into the inner chamber 33 until front wall portion 14A closes chamber 50. At this point, the food products are suspended in food tray 51 above drip tray 40 and below radiant heater 36. When radiant heater 36 is energized, thermal energy is radiated therefrom directly onto the food products contained in the cooking tray 51. Simultaneously, drive motor 19 is energized to cause air to circulate from impeller 20 into plenums 34, 35 and through side vents 38 into inner chamber 33 as shown by the arrows in FIG. 3. Since food tray 51 has a perforated bottom 53 (shown as a screen in the drawing) and rests on shoulders 45, 48 above drip tray 40, air entering inner chamber 33 through side vents 38 passes upwardly through the bottom 53 of the food tray 51 through and around food products contained therein. The circulating air is then drawn over radiant heater 36 and through top vents 37 to be re-circulated. The recirculating air is thus continuously heated and passed upwardly through and around the food products contained in food tray 51 while the food in food tray 51 is simultaneously heated by radiant energy from radiant heater 36. Crumbs, oils and the like resulting from the cooking process drop through the bottom 53 of food tray 51 and are caught in drip tray 40. The simultaneous heating by radiant energy from above and convection heating by hot air circulating through and around the food product from below causes the food product to be rapidly cooked and thoroughly browned. Since the cooking chamber 50 is completely enclosed, smoke, grease and other cooking vapors cannot escape therefrom during the cooking process.

When the food products are sufficiently cooked, the assembly of the food tray 51 and drip tray 40 is withdrawn as a unit so that hot oils, crumbs, etc., dripping from the food tray 51 are contained within drip tray 40.

It will be appreciated that when the front wall portion 14A is removed to withdraw the food tray 51 and drip tray 40, smoke and vapors resulting from the cooking process may escape from the chamber 50. To minimize escape of such vapors, the side members 32 and top member 31 of shell 30 may be provided with flanges 32A and 31A, respectively, which at least partially block the opening between the inner shell 30 and the walls of the cooking chamber 50. To trap vapors which escape from the cooking chamber (either by leakage around front wall 14 or when the cooking chamber 50 is opened), a vapor trap 56 is mounted directly above front wall 14. Vapor trap 56 has an entrance 57 extending the full horizontal length thereof along its lower edge. Air drawn therethrough is exhausted directly into vented space 21 between top wall 15 and top cover 18.

Vapor trap 56 supports a filter 58 between the entrance 57 and vented space 21 so that air which enters vapor trap 56 passes through filter 58 and is exhausted into vented space 21. Blowers 60 mounted in vented space 21 draw air through vapor trap 56 into vented space 21 and exhaust the air through back vent 61 in the back portion 18A of top cover 18. When blowers 60 are operating, any vapors escaping from the cooking chamber 50 are drawn through filter 58 and exhausted through back vent 61. Grease and the like trapped in filter 58 drains into grease tray 59 directly below the filter 58 (see FIG. 7) and is trapped therein for removal and disposal. Accordingly, the vapor trap 56 prevents escape of smoke, cooking vapors and the like without the use of external vent systems.

In the preferred embodiment front wall 14 is readily removeable for cleaning and to provide access to the interior of cooking chamber 50. For ease of cleaning, the interior surfaces of rear wall 11, side walls 12 and 13, top wall 15 and floor 16 are all preferably made of stainless steel. The radiant heater 36 is preferably a plug-in module so that it may be easily removed for cleaning and/or replacement. Likewise, shell 30, drip tray 40 and food tray 51 are all preferably made of stainless steel or the like. These components may be easily removed and thus are adapted for easy thorough cleaning.

It will be appreciated that all components of the apparatus illustrated may be readily fabricated from generally available materials. The parts which need frequent cleaning (such as the drip tray 40, food tray 51, shell 30 and front wall 14, 14A) may be formed to fit together for assembly and disassembly without using tools or the like, thus insuring that thorough cleaning may be easily accomplished. Furthermore, while handle 52 is shown as a device fixedly secured to portion 14A of front wall 14, various other structures such as detachable grips, brackets and the like may be used for handling the food tray 51.

Use of forced air convection in combination with radiant heating in an enclosed chamber as described herein permits rapid preparation of most food products in a safe, clean, grease-free environment. Most ovenable food products are fully cooked as much as 60% faster than in conventional ovens. Furthermore, the invention is particularly advantageous in preparation of meat and poultry products which are either pre-cooked (partially cooked where the outside is par-fried but the interior is raw) or fully cooked since grease-laden vapors are normally not produced in excessive amounts. Any such vapors which may escape from the cooking chamber during the cooking process are captured by the vapor trap 56.

By eliminating use of hot oil vats and the need for external vent systems, food products which were traditionally fried or grilled can be rapidly and safely prepared on-site with inexpensive equipment. Accordingly, many food products which could not previously be conveniently and inexpensively served as fast food items can safely be prepared and made available at any desired location.

From the foregoing it will be recognized that the principles of the invention may be employed in various arrangements to obtain the benefit of the many advantages and features disclosed. It is to be understood, therefore, that even though numerous characteristics and advantages of the invention have been set forth together with details of the structure and function of the invention, this disclosure is to be considered illustrative only. Various changes and modifications may be made in detail, especially in matters of size, shape and arrangements of parts, without departing from the spirit and scope of the invention as defined by the appended claims.

What is claimed:

1. Cooking apparatus comprising:
   (a) an enclosure having a floor, two opposed side walls, a front wall, a rear wall and a top wall;
   (b) a shell defining an inner chamber removeably mounted in said enclosure, said shell having a top member and two opposed side members with each of said side members aligned substantially parallel with and spaced from one of said side walls to define a plenum between each side member and the side wall adjacent thereto;
   (c) a drip tray positioned substantially adjacent said floor between the side members of said shell and having a top opening substantially corresponding to the floor area defined by said front wall, said rear wall and said side members;
   (d) a source of radiant heat mounted within said inner chamber above said drip tray;
   (e) vents in said side members near said floor which permit air to pass between the plenums and said inner chamber;
   (f) a food tray removeably mounted between said drip tray and said source of radiant heat, said food tray adapted to support food products in said inner chamber on a tray bottom which permits liquids and air to pass therethrough;
   (g) vents in said top member which permit air to pass therethorough; and
   (h) air circulating means adapted to force air through the vents in said side members, over said drip tray, through the bottom of said food tray, and through the vents in said top member.

2. Cooking apparatus as defined in claim 1 wherein said food tray is carried on a removeable portion of said front wall.

3. Cooking apparatus as defined in claim 1 wherein
   (i) the side members of said shell define tracks for supporting said drip tray;
   (ii) said drip tray is slideably mounting on said tracks; and
   (iii) said cooking tray is removeably attached to said drip tray.

4. Cooking apparatus as defined in claim 1 wherein said tray bottom is a stainless steel screen.

5. Cooking apparatus as defined in claim 1 including a vapor trap positioned above said front wall, said vapor trap comprising:
   (i) an entrance opening adapted to collect vapors escaping from said enclosure;
   (ii) an exhaust opening;
   (iii) a filter between said entrance opening and said exhaust opening; and
   (iv) a tray aligned to collect liquids which collect on and drain from said filter.

6. Cooking apparatus as defined in claim 5 including means for drawing air through said vapor trap.

7. Cooking apparatus comprising:
   (a) an enclosure having a floor, two opposed side walls, a front wall, a rear wall and a top wall;
   (b) a drip tray positioned substantially adjacent said floor;
   (c) a source of radiant heat mounted within said enclosure above said drip tray;
   (d) a food tray removeably mounted in said enclosure between said drip tray and said source of radiant heat, said food tray adapted to support food products on a tray bottom which permits liquids and air to pass therethrough;
   (e) means for forcing air within said enclosure to circulate over said source of radiant heat and through said tray bottom; and
   (f) a vapor trap positioned above said front wall, said vapor trap comprising:
      (i) an entrance opening adapted to collect vapors escaping from said enclosure;
      (ii) an exhaust opening;
      (iii) a filter between said entrance opening and said exhaust opening; and
      (iv) a tray aligned to collect liquids which collect on and drain from said filter.

8. Cooking apparatus as defined in claim 7 including means for drawing air through said vapor trap.

* * * * *